(12) United States Patent
Kitamura et al.

(10) Patent No.: US 9,725,339 B2
(45) Date of Patent: Aug. 8, 2017

(54) REVERSE OSMOSIS TREATMENT APPARATUS

(71) Applicant: Hitachi, Ltd., Tokyo (JP)

(72) Inventors: Kotaro Kitamura, Tokyo (JP); Shinichi Yoshikawa, Tokyo (JP); Hiroki Miyakawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 265 days.

(21) Appl. No.: 14/366,353

(22) PCT Filed: Dec. 6, 2012

(86) PCT No.: PCT/JP2012/081665
§ 371 (c)(1),
(2) Date: Jun. 18, 2014

(87) PCT Pub. No.: WO2013/094427
PCT Pub. Date: Jun. 27, 2013

(65) Prior Publication Data
US 2014/0360941 A1    Dec. 11, 2014

(30) Foreign Application Priority Data

Dec. 19, 2011 (JP) ................................ 2011-277238

(51) Int. Cl.
*B01D 61/02* (2006.01)
*B01D 63/12* (2006.01)
(Continued)

(52) U.S. Cl.
CPC ............ *C02F 1/441* (2013.01); *B01D 61/022* (2013.01); *B01D 63/12* (2013.01);
(Continued)

(58) Field of Classification Search
None
See application file for complete search history.

(56) References Cited

U.S. PATENT DOCUMENTS

| 2003/0141250 A1* | 7/2003 | Kihara | B01D 61/022 |
| | | | 210/652 |
| 2011/0309007 A1 | 12/2011 | Ito et al. | |
| 2012/0067808 A1* | 3/2012 | Tayalia | B01D 61/06 |
| | | | 210/321.66 |

FOREIGN PATENT DOCUMENTS

| JP | 2000-51663 A | 2/2000 |
| JP | 2000-051663 A | 2/2000 |

(Continued)

*Primary Examiner* — Krishnan S Menon
(74) *Attorney, Agent, or Firm* — Oliff PLC

(57) ABSTRACT

Provided is a reverse osmosis treatment apparatus which decreases operation power by utilizing a back pressure caused by regulating an amount of permeated water. The reverse osmosis treatment apparatus includes a first pressure vessel for a primary treatment of untreated water, and a second pressure vessel for a secondary treatment of the water treated by the primary treatment, wherein a reverse osmosis membrane element having a reverse osmosis membrane or the plurality of reverse osmosis membrane elements are arranged in series along a water collection pipe in the first pressure vessel and the second pressure vessel. The first pressure vessel includes a first outlet pipe which discharges permeated water, and a permeated water flow control valve connected to the first outlet pipe and regulating a pressure in the first pressure vessel. An energy recovery apparatus is provided between the first outlet pipe and the permeated water flow control valve.

7 Claims, 13 Drawing Sheets

(51) Int. Cl.
  *C02F 1/44* (2006.01)
  *C02F 1/00* (2006.01)
  *C02F 1/52* (2006.01)
  *C02F 1/76* (2006.01)
  *C02F 103/08* (2006.01)
  *C02F 101/12* (2006.01)

(52) U.S. Cl.
  CPC ...... *B01D 2313/19* (2013.01); *B01D 2313/24* (2013.01); *B01D 2313/246* (2013.01); *B01D 2317/022* (2013.01); *B01D 2317/027* (2013.01); *B01D 2317/04* (2013.01); *B01D 2319/022* (2013.01); *C02F 1/004* (2013.01); *C02F 1/5245* (2013.01); *C02F 1/76* (2013.01); *C02F 2101/12* (2013.01); *C02F 2103/08* (2013.01); *C02F 2201/004* (2013.01); *C02F 2209/03* (2013.01); *C02F 2209/05* (2013.01); *C02F 2209/40* (2013.01); *C02F 2301/08* (2013.01); *C02F 2303/10* (2013.01); *Y02W 10/30* (2015.05)

(56) References Cited

FOREIGN PATENT DOCUMENTS

JP  2003-170165 A  6/2003
JP  2010-179264 A  8/2010

\* cited by examiner

REVERSE OSMOSIS TREATMENT APPARATUS

TECHNICAL FIELD

The present invention relates to a reverse osmosis treatment apparatus, in particular, relates to the reverse osmosis treatment apparatus which recovers a back pressure generated when performing pressure regulation.

BACKGROUND ART

A desalination apparatus having a reverse osmosis membrane (hereinafter, referred to as a "RO membrane") has a plurality of RO membrane elements 222 which are arranged in series inside a pressure vessel 224 of a cylindrical shape to use reverse osmosis pressure, as shown in FIG. 12, and each RO membrane element 222 is connected to a water collection pipe 234 which is located in the center of the RO membrane elements 222. Feedwater is supplied from one side of the desalination apparatus by a high pressure pump, and the inside of the pressure vessel 224 is pressurized in accordance with an open degree of a valve provided on the side of concentrated water. When the applied pressure exceeds the osmotic pressure of the feedwater, desalinated water (permeated water) flows into the central water collection pipe 234 through the RO membranes.

The feedwater supplied into the pressure vessel 224 has higher salt concentration as the feedwater moves toward the concentrated water side from the feedwater side, so that the pressure applied to the pressure vessel 224 can be eventually determined by a salt concentration, an amount of the permeated water, and a flow rate of the feedwater on the membrane surface in the final stage. Therefore, the amount of the permeated water increases on the feedwater side in the pressure vessel 224, because the pressure more than necessary is applied thereto. For example, FIG. 13 shows a relationship between "element position" of the RO membrane and "relative flux", when seven RO membrane elements 222 are arranged in series. As shown in FIG. 13, the permeated water volume decreases as the element position moves from the feedwater side to the concentrated water side. This is because the salt concentration of an untreated water increases as the element position moves from the feedwater side to the concentrated water side, and a pressure higher than the pressure on the feedwater side is required on the concentrated water side. However, the pressure applied on the feedwater side is the same with that on the concentrated water side, so that more permeated water can be produced on the feedwater side than on the concentrated water side. Since the amount of the permeated water is not uniform in the pressure vessel 224 as shown in FIG. 13, a required power is increased and the RO membrane elements on the feedwater side is contaminated.

To solve such a problem, for example, a seawater desalination apparatus which includes a plug for blocking the water collection pipe on a connection portion of the RO membrane element in the middle of the pressure vessel, and permeated water lines through which the permeated water separated back and forth by the plug is respectively discharged to the outside of the pressure vessel, is described in Patent Document 1. It is further described that the seawater desalination apparatus has an energy recovery apparatus which regulates an amount of front-side permeated water separated by the plug in the pressure vessel to recover the back pressure.

CITATION LIST

Patent Literature

{Patent Document 1}
Japanese Patent Application Publication No. 2010-179264

SUMMARY OF INVENTION

Technical Problem

However, the seawater desalination apparatus described in Patent Document 1 has not been able to take full advantage of the back pressure of the front-side permeated water in the pressure vessel, because a flow control valve is provided between the energy recovery apparatus and the pressure vessel having the reverse osmosis membrane.

The present invention has been devised in view of such circumstances, and a purpose thereof is to provide a reverse osmosis treatment apparatus which can effectively recover a back pressure and apply the back pressure to other systems in the apparatus.

Solution to Problem

For achieving the purpose, the present invention provide a reverse osmosis treatment apparatus, comprising a first pressure vessel for a primary treatment of untreated water, and a second pressure vessel for a secondary treatment of the water treated by the primary treatment, wherein a reverse osmosis membrane element having a reverse osmosis membrane or the plurality of reverse osmosis membrane elements are arranged in series along a water collection pipe in the first pressure vessel and the second pressure vessel, wherein the first pressure vessel comprises an untreated water inlet pipe which supplies the untreated water on one end thereof, a first concentrated water outlet pipe which discharges the water treated by the primary treatment on the other end thereof, a first outlet pipe which discharges permeated water, and a permeated water flow control valve which is connected to the first outlet pipe and regulates a pressure in the first pressure vessel, wherein the second pressure vessel comprises a primarily treated water inlet pipe which introduces the water treated by the primary treatment on one end thereof, a second concentrated water outlet pipe which discharges the water treated by the secondary treatment on the other end thereof, and a second outlet pipe which discharges the permeated water, and wherein an energy recovery apparatus is provided between the first outlet pipe and the permeated water flow control valve.

According to the present invention, the energy recovery apparatus is provided between the first outlet pipe and the permeated water flow control valve so that a back pressure inside the first pressure vessel can be regulated by the permeated water flow control valve, and the back pressure can be recovered by using the energy recovery apparatus. It is possible to save power of the reverse osmosis treatment apparatus by using the energy of the back pressure as an operation power thereof.

The reverse osmosis treatment apparatus according to another embodiment of the present invention includes the energy recovery apparatus which is preferably a PX-type energy recovery apparatus or a DWEER-type energy recovery apparatus.

The reverse osmosis treatment apparatus according to another embodiment of the present invention can use the energy as a pressure for supplying a liquid therein by using the PX-type energy recovery apparatus or the DWEER-type energy recovery apparatus.

The reverse osmosis treatment apparatus according to another embodiment of the present invention includes the energy recovery apparatus which is preferably a turbocharger-type energy recovery apparatus.

The reverse osmosis treatment apparatus according to another embodiment of the present invention can use the energy as a pressure for supplying a liquid therein by using the turbocharger-type energy recovery apparatus. In addition, the turbocharger-type energy recovery apparatus can be used for a wide range of liquids, because the liquids are not required to be in contact with each other when the pressure is transmitted.

The reverse osmosis treatment apparatus according to another embodiment of the present invention includes the energy recovery apparatus which is preferably a turbine generator.

The reverse osmosis treatment apparatus according to another embodiment of the present invention can use the back pressure in the first pressure vessel for the turbine generator to use a generated power for the apparatus.

The reverse osmosis treatment apparatus according to another embodiment of the present invention includes a third pressure vessel having reverse osmosis membrane elements which are capable of reverse osmosis treatment at low pressure, wherein the energy recovery apparatus preferably converts a back pressure of the permeated water which is discharged from the first pressure vessel, to the pressure applied to the permeated water which is discharged from the second pressure vessel, and wherein the permeated water having an increased pressure from the second pressure vessel is preferably treated in the third pressure vessel.

According to the present invention, the energy recovery apparatus converts the back pressure from the first pressure vessel to the pressure applied to the permeated water from the second pressure vessel. The permeated water from the second vessel is not sufficiently treated in some cases, because the water which is supplied to the second pressure vessel is concentrated water which has been treated by the first treatment. In this case, the reverse osmosis treatment can be further performed with low pressure, because the water to be treated is the permeated water which has already been treated. Therefore, the permeated water from the second vessel can be used as the pressure to be sent to the third vessel. Even if the liquids to exchange the pressures have contact with each other, the difference between the qualities of the liquids is so small and the contact time between the liquids is so short that the qualities of the liquids are not particularly affected.

The reverse osmosis treatment apparatus according to another embodiment of the present invention includes a high pressure pump which supplies the untreated water to the first pressure vessel, wherein an energy which is recovered by the turbocharger-type energy recovery apparatus is preferably used as a supply means which supplies an untreated liquid to the high pressure pump.

The reverse osmosis treatment apparatus according to another embodiment of the present invention uses the back pressure from the first pressure vessel as the supply means which supplies the untreated liquid to the high pressure pump. The untreated liquid can be supplied to the high pressure pump with low pressure by using the back pressure from the first pressure vessel.

The reverse osmosis treatment apparatus according to another embodiment of the present invention includes a pretreatment system which performs a pretreatment for the untreated water which is supplied to the first pressure vessel, wherein the enemy which is recovered by the turbocharger-type energy recovery apparatus is preferably used as a supply means which supplies the untreated liquid to the pretreatment system.

The reverse osmosis treatment apparatus according to another embodiment of the present invention uses the back pressure from the first pressure vessel as a supply means which supplies the untreated liquid to the pretreatment system. The untreated liquid can be supplied to the pretreatment system with low pressure by using the back pressure from the first pressure vessel.

Advantageous Effects of Invention

According to the present invention, the reverse osmosis treatment apparatus has the first pressure vessel and the second pressure vessel separately, respectively used for the primary treatment of the untreated water and the secondary treatment of the water treated by the primary treatment, so that a total amount of the permeated water by the reverse osmosis treatment apparatus can be increased. In addition, the reverse osmosis treatment apparatus can use the energy effectively by recovering the back pressure by the energy recovery system, wherein the back pressure is generated by decreasing the amount of the permeated water in the first vessel.

DESCRIPTION OF EMBODIMENTS

Hereinafter, preferred embodiments of the present invention will be explained with reference to the accompanying drawings. The present invention will be explained with reference to the preferred embodiments below, however, the embodiments can be modified by many methods without departing from the scope of the present invention, and embodiments other than the present embodiment can be utilized. Therefore, all modifications in the scope of the present invention are included in claims.

Figure 1:
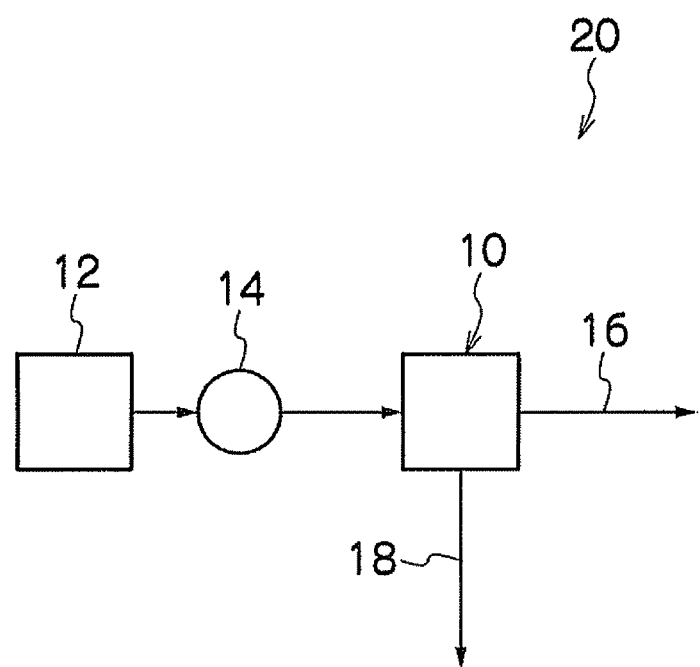
FIG. 1 is a block diagram of a desalination system which is provided with a reverse osmosis treatment apparatus according to an embodiment of the present invention.

FIG. 1 is a block diagram of a desalination system 20 which is assembled with a reverse osmosis treatment apparatus 10 according to an embodiment of the present invention. It should be noted that the reverse osmosis treatment apparatus according to the present invention can be used for the desalination system which is utilized for wastewater reuse, pure water production, brine desalination, and seawater desalination, for example.

The desalination system 20 shown in FIG. 1 is configured with the reverse osmosis treatment apparatus 10, a high pressure pump 14, and a tank 12 which stores an untreated water. The untreated water in the tank 12 is supplied to the reverse osmosis treatment apparatus 10 with high pressure by the high pressure pump 14, and is treated (desalinated) with reverse osmosis by respective RO membranes (treatment membranes) of the reverse osmosis treatment apparatus 10, so that the untreated water can be separated into permeated water (separated water) 16 and concentrated water (untreated water) 18 which is concentrated with salt. The permeated water 16 obtained in this manner is discharged to the outside of the reverse osmosis treatment apparatus 10 through one outlet pipe, and the concentrated water 18 is also discharged to the outside of the reverse osmosis treatment apparatus 10 through the other outlet pipe which is different from the outlet pipe through which the permeated water is discharged. The pressure in the reverse osmosis treatment apparatus 10 can be raised to a high pressure by the high pressure pump 14. In addition, a valve is provided on the outlet side of the reverse osmosis treatment apparatus 10, so that the pressure in the reverse osmosis treatment apparatus 10 can be regulated by the opening degree of the valve.

The untreated water in the tank 12 can be used as a raw water, but the water which has been treated to remove turbid components and the like contained in the raw water by a pretreatment is preferably used as the untreated water. As the pretreatment, there are treatments such as use of filters, and sterilizing microorganisms as well as removing precipitated particles in the raw water by introducing the raw water to a sedimentation tank and adding fungicides such as chlorine. The untreated water which has been treated to remove by filtration the turbid components aggregated by adding aggregating agent such as iron chlorides to the raw water, can be also used.

Figure 5:
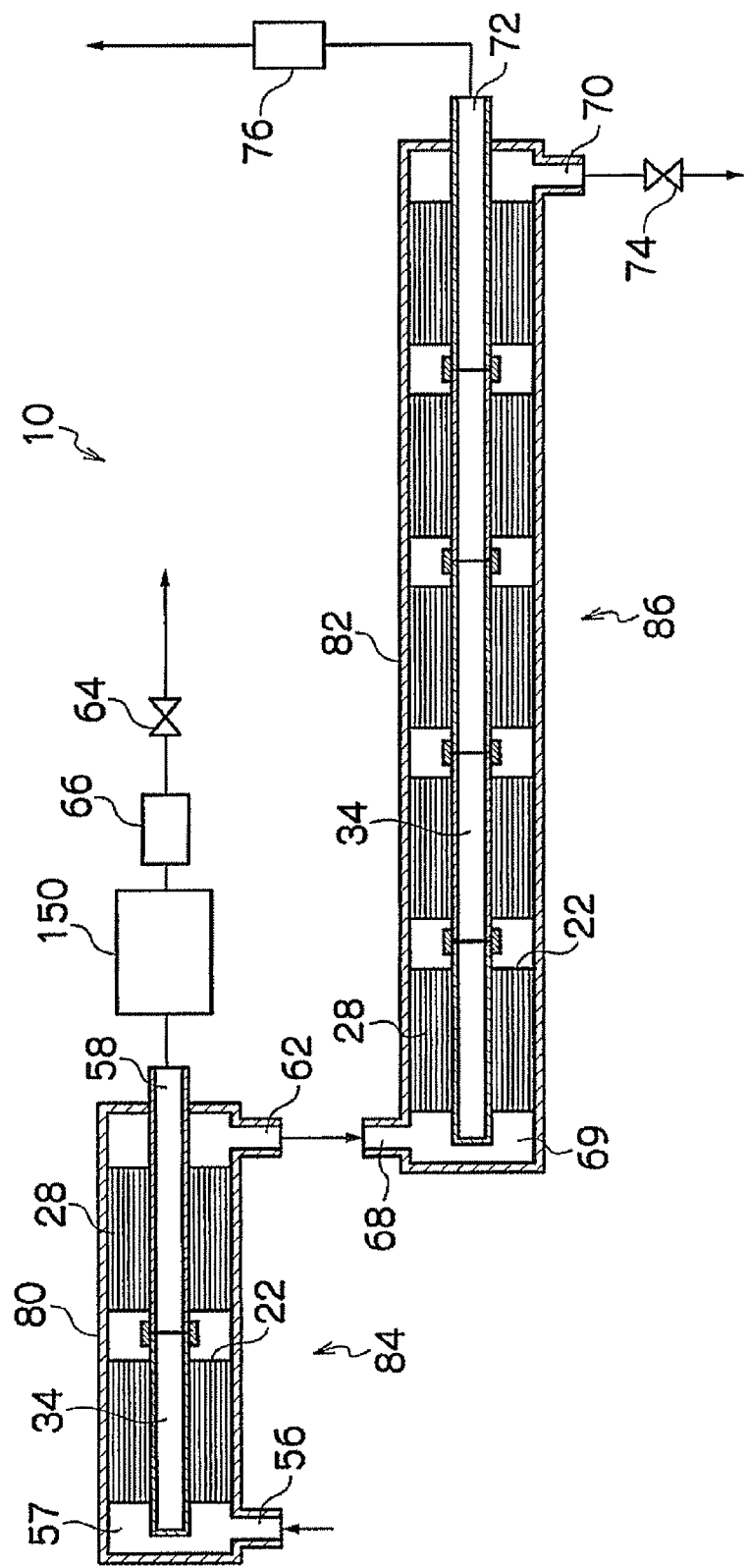
FIG. 5 is a cross-sectional view showing a schematic configuration of the reverse osmosis treatment apparatus according to the embodiment of the present invention.

The reverse osmosis treatment apparatus 10 is configured with a single unit which includes a first module 84 and a second module 86 shown in FIG. 5, or is configured with the plurality of single units connected in parallel with one another. The first module 84 and the second module 86 are assembled by filling up an element 22 shown in FIG. 2, respectively, into a cylindrical first vessel 80 and a cylindrical second vessel 82 shown in FIG. 5, or by filling up the plurality of elements 22 which are connected in series, respectively, into the cylindrical first vessel 80 and the cylindrical second vessel 82 shown in FIG. 5.

Figure 2:
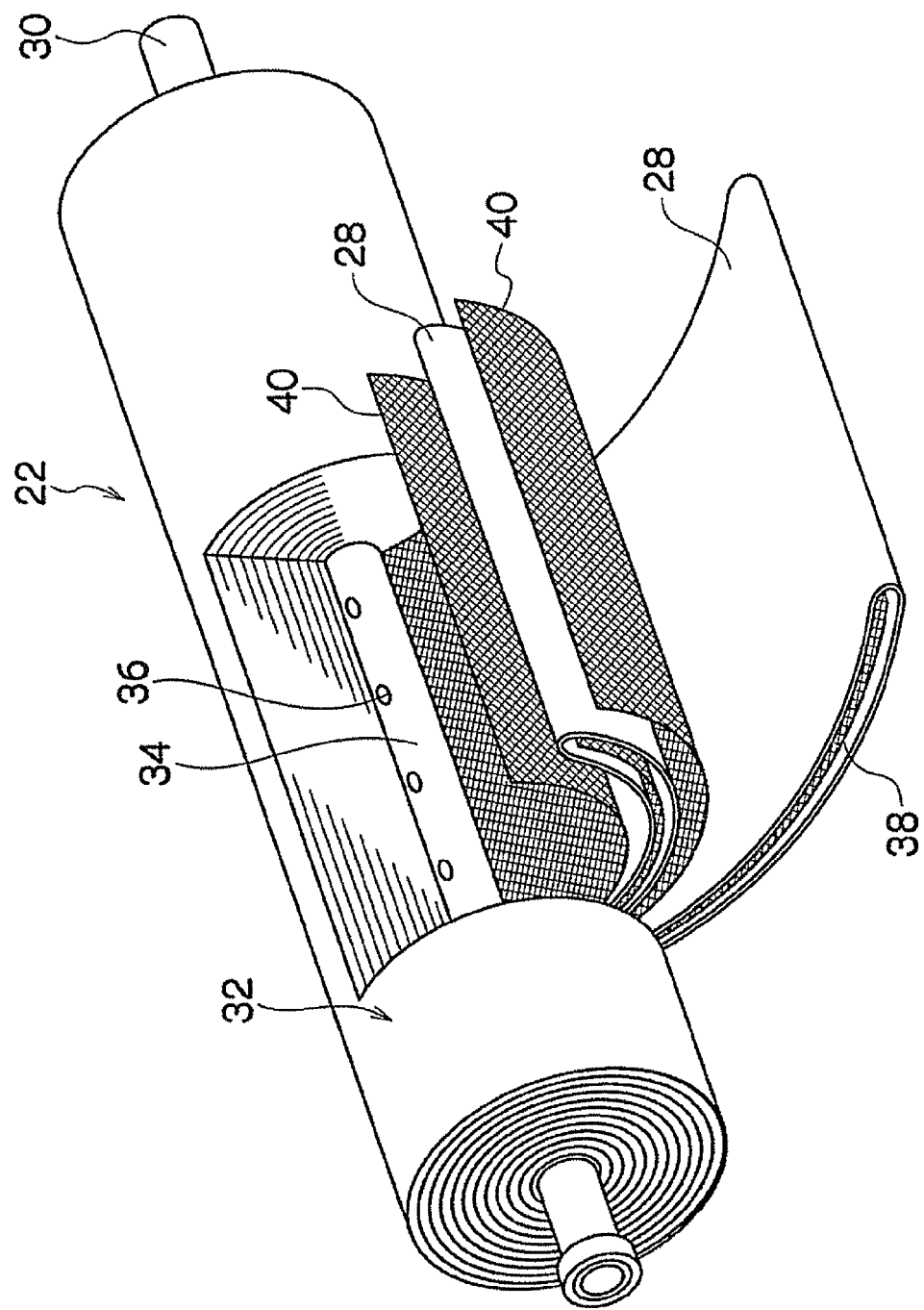
FIG. 2 is a perspective view showing a configuration of an element of the reverse osmosis treatment apparatus according to the embodiment of the present invention.
Figure 3:
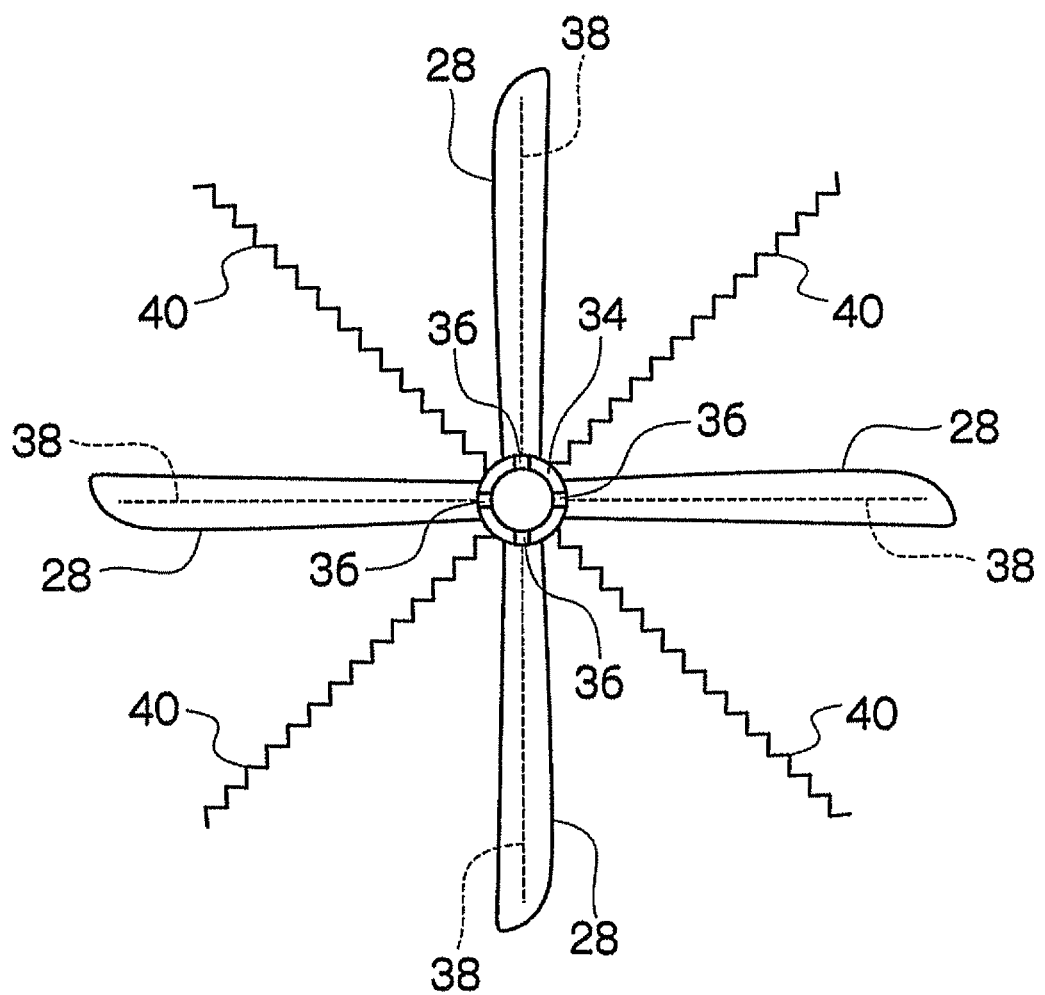
FIG. 3 is a front view of the element in a state before the RO membranes of the element shown in FIG. 2 are wound around.
Figure 4:
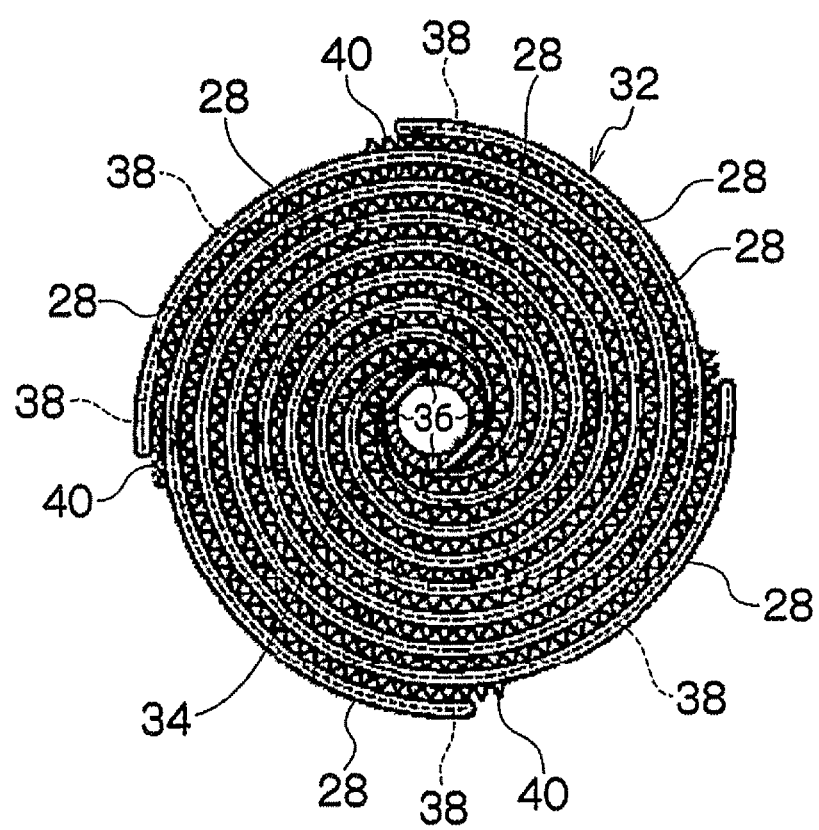
FIG. 4 is a front view of the element shown in FIG. 2.

As shown in FIG. 2, the element 22 is configured by arranging a membrane unit 32 including RO membranes 28 and an outlet pipe 30 around a water collection pipe 34. The membrane unit 32 is configured by connecting four bag-body shaped RO membranes 28 radially to the outer periphery of the water collection pipe 34 as shown in FIG. 3, and further by winding the RO membranes 28 spirally around the water collection pipe 34 as shown in FIG. 4. The bag-body shaped RO membrane 28 has an open end to be connected to the water collection pipe 34 so that the open end can be in communication with through holes 36 of the water collection pipe 34 shown in FIG. 3. The untreated water flows on the outer surface of the RO membranes 28, and is desalinated by being permeated through the RO membranes 28. The permeated water after desalination through the RO membranes 28 is collected in the water collection pipe 34 from inside the RO membranes 28 through the opening of the RO membranes 28 and the through holes 36 of the water collection pipe 34, and is discharged from the element 22 through the water collection pipe 34 and the outlet pipe 30. Reference numerals 38 in FIG. 3 denote mesh spacers which are arranged inside the RO membranes 28. Inner spaces of the RO membranes 28 are kept not to be collapsed by the mesh spacers 38, even if the RO membranes 28 are spirally wound around the water collection pipe 34. Further, reference numerals 40 denote mesh spacers which are arranged between the adjacent RO membranes 28. The mesh spacers 40 are also connected radially to the periphery of the water collection pipe 34 in the same manner as the RO membranes 28.

FIG. 5 is a cross-sectional view of the reverse osmosis treatment apparatus 10 according to the embodiment of the present invention. In the present embodiment, the first module 84 for the first treatment has two elements 22 connected in series in the first vessel 80, and the second module 86 for the second treatment has five elements 22 connected in series in the second vessel 82. The first vessel 80 has one opening through which the untreated water is introduced therein on one end portion thereof, and has the other opening through which a first concentrated water (water treated by the first treatment) which remains untreated in the first vessel 80 is discharged therefrom on the other end portion thereof. The second vessel 82 has also one opening through which the untreated water is introduced therein on one end portion thereof, and has the other opening through which a second concentrated water (water treated by the second treatment) which remains untreated in the second vessel 82 is discharged therefrom on the other end portion thereof. The opening on the introduction side of the first vessel 80 is subjected to a predetermined operation pressure by the high pressure pump 14. In addition, the first vessel 80 and the second vessel 82 can be made of an FRP or the like, so that they can withstand a high pressure (not less than 5 MPa). In addition, the first vessel 80 and the second vessel 82 are preferably connected with each other by a pipe which is made of material capable of withstanding the high pressure.

As shown in FIG. 5, the first vessel 80 has an untreated water inlet pipe 56 through which the untreated water is introduced in the first vessel 80, and has a first concentrated water outlet pipe 62 through which the first concentrated water remaining as the untreated water which was not permeated into the water collection pipe 34 is discharged.

The permeated water collected in the water collection pipe 34 through the RO membranes 28 is discharged from the first vessel 80 through a first outlet pipe 58 which is provided on the side of the first concentrated water outlet pipe 62. An energy recovery apparatus 150, a measuring instrument 66, and a permeated water flow control valve 64 are provided on the outlet of the first outlet pipe 58. The pressure in the first vessel 80 is adjusted to regulate an amount of the permeated water from the vessel 80 by applying a back pressure which is regulated by the permeated water flow control valve 64. The operation power of the reverse osmosis treatment apparatus 10 can be reduced by recovering the back pressure by the energy recovery apparatus 150 and by using the back pressure therefor.

The second vessel 82 has a primary treated water inlet pipe 68 through which the first concentrated water discharged from the first vessel 80 is introduced in the second vessel 82, and has a second concentrated water outlet pipe 70 through which the second concentrated water remaining as the untreated water which was not permeated into the water collection pipe 34 is discharged. A concentrated water outlet valve 74 which regulates the pressure in the second vessel 82 is provided on the outlet of the second concentrated water outlet pipe 70. The permeated water collected in the water collection pipe 34 through the RO membranes 28 is discharged from the second vessel 82 through the second outlet pipe 72 which is provided on the side of the second concentrated water outlet pipe 70. A measuring instrument 76 is provided on the outlet of the second outlet pipe 72.

According to the reverse osmosis treatment apparatus 10, the untreated water supplied from the tank 12 in FIG. 1 through the untreated water inlet pipe 56 is introduced sequentially into elements 22 through a flow passage 57, and is collected in the water collection pipe 34 after being permeated through the RO membranes 28 of the elements 22. In the present embodiment, the reverse osmosis treatment is performed by two steps of the first vessel 80 and the second vessel 82, and the permeated water which is treated in the first vessel 80 is discharged from the first vessel 80 through the first outlet pipe 58. The first concentrated water which remains not permeated into the water collection pipe 34 is discharged from the first concentrated outlet pipe 62, and is supplied to the second vessel 82 through the primary treated water inlet pipe 68 to be introduced sequentially into elements 22 through a flow passage 69, and is collected in the water collection pipe 34 after being permeated by the RO membranes 28. The permeated water treated in the second vessel 82 is discharged from the second vessel 82 through the second outlet pipe 72. The second concentrated water which remains not permeated into the water collection pipe 34 is discharged from the second concentrated water outlet pipe 70.

Figure 6:
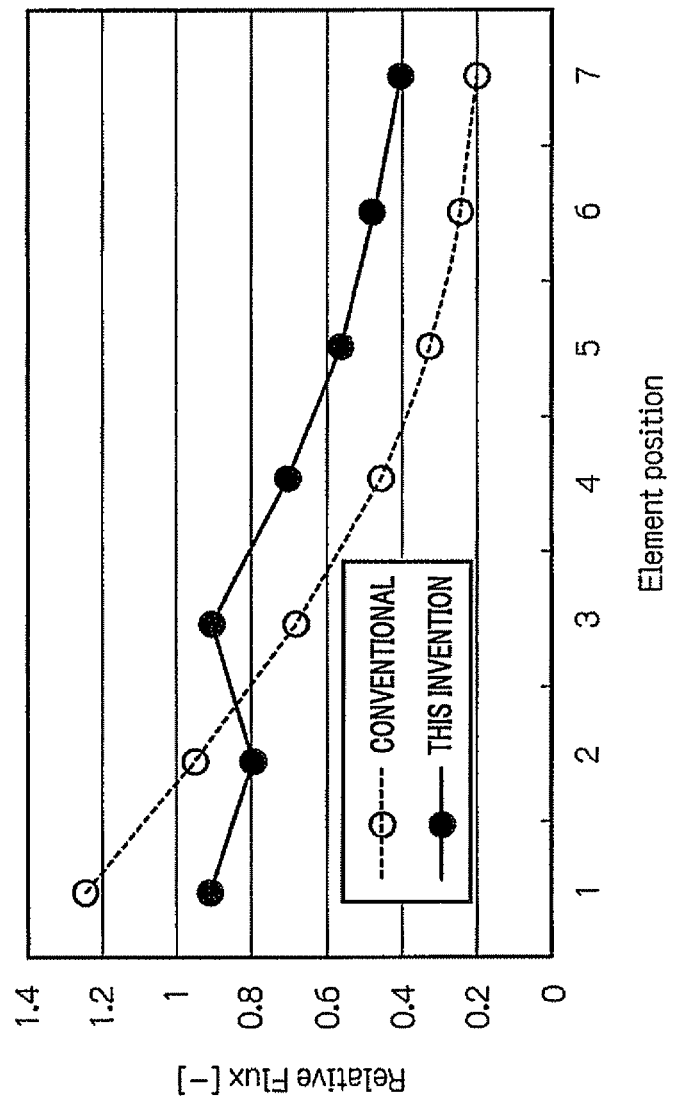
FIG. 6 is a graph showing a relationship between a "relative flux" of permeated water and an "element position" of the RO membrane element of the reverse osmosis treatment apparatus according to the embodiment of the present invention.

FIG. 6 is a graph showing a relationship between a "relative flux" of permeated water and an "element position" of the RO membrane element of the reverse osmosis treatment apparatus according to the embodiment of the present invention. Here, the data of the present invention are obtained by experiments using two elements ("element positions" No. 1 and No. 2 on the horizontal axis in FIG. 6) installed in the first vessel and five elements ("element positions" No. 3 to No. 7 on the horizontal axis in FIG. 6) installed in the second vessel. As for conventional reverse osmosis treatment apparatuses, much permeated water is produced from the feedwater side, and the amount of the permeated water decreases as the element position moves to the concentrated water side. This is because the pressure applied to the vessel is determined by the pressure applied to the element of the final stage. On the other hand, as for the present invention, the pressure in the first vessel 80 can be regulated by the permeated water flow control valve 64, so that the "relative flux" can be set to the desired value as shown in FIG. 6, and the amount of the permeated water can be decreased. The salt concentration of the first concentrated water can be reduced by decreasing the amount of the permeated water in the first vessel 80, so that the amount of the permeated water in the second vessel 82 can be increased as shown by the "element positions" No. 3 to No. 7 in FIG. 6. Therefore, the ununiformity of the amount of the permeated water from each RO membrane element can be eliminated, and thereby the amount of the permeated water from the reverse osmosis treatment apparatus can be increased as a whole.

The flow rate of the permeated water in the first vessel 80 can be regulated by adjusting the opening degree of the permeated water flow control valve 64 in accordance with the value measured by the measuring instrument 66, and the flow rate of the permeated water in the second vessel 82 can be regulated by adjusting the opening degree of the concentrated water discharge valve 74 in accordance with the value measured by the measuring instrument 76. The flow rate of the permeated water can be also controlled by providing a pressure gauge between the high pressure pump 14 and the reverse osmosis treatment apparatus 10 to adjust the pressure pump 14 in accordance with the value of the pressure gauge. As measuring instruments 66, 76, a flow rate meter, the pressure gauge, and a conductivity meter can be used. Since the conductivity is varied depending on the salt concentration, the amount of the permeated water can be confirmed by measuring the conductivity to monitor the salt concentration. By adjusting the flow rate of the permeated water in the first vessel 80 by the opening degree of the permeated water flow control valve 64, the pressure of 1 to 2 MPa is applied to inside the first vessel 80.

Although two elements 22 are installed in the first vessel 80 and five elements are installed in the second vessel 82 in FIG. 5, the number of the elements is not limited to this. However, the number of the elements 22 in the first vessel 80 is preferably equal to or less than the number of the elements 22 in the second vessel 82. The permeated water can be produced effectively from the reverse osmosis treatment apparatus as a whole by changing the elements 22 in the first vessel, because the elements 22 on the feedwater side are easily contaminated. The elements 22 in the first vessel 80 can be replaced easily by reducing the number of the elements 22 in the first vessel 80. Taking into consideration that the permeated water is discharged from the first vessel 80, it is preferred to use two elements 22 in the first vessel 80 according to FIG. 6, however, it is enough to use one element 22 from the view point of the contamination. The number of the elements 22 in the first vessel 80 is preferably 1 to 4, and more preferably 2 to 3.

Figure 7:
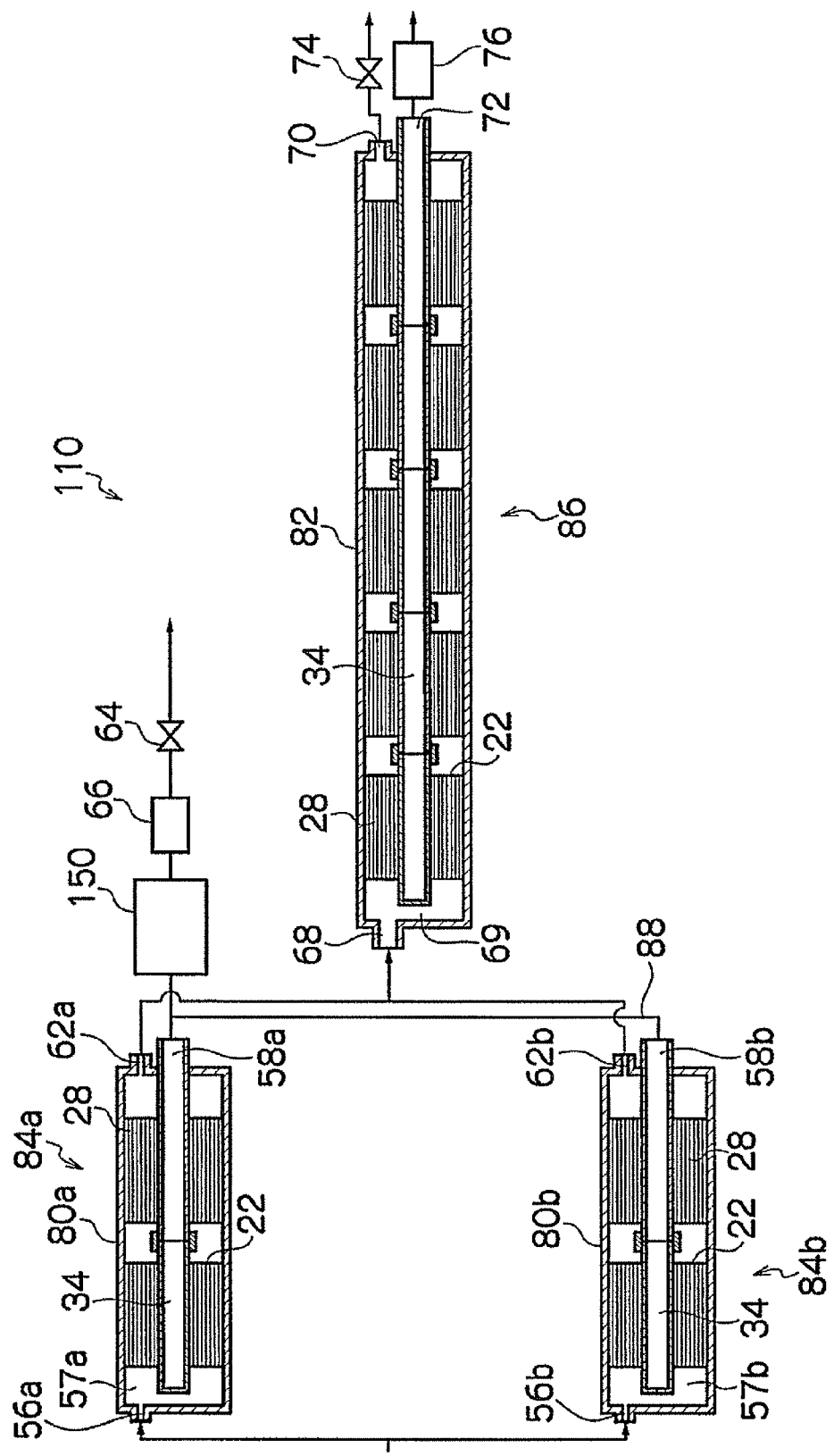
FIG. 7 is a cross-sectional view showing a schematic configuration of the reverse osmosis treatment apparatus according to another embodiment of the present invention.

FIG. 7 is a cross-sectional view of the reverse osmosis treatment apparatus 110 according to another embodiment of the present invention. The reverse osmosis treatment apparatus 110 shown in FIG. 7 is different from the reverse osmosis treatment apparatus 10 shown in FIG. 5 in that two first vessels 80a, 80b are installed. The reverse osmosis treatment apparatus 110 shown in FIG. 7 includes end-port vessels which have outlets of the concentrated water at the end portions of the first vessels 80a, 80b and the second vessel 82 in the flow direction of the untreated water. On the other hand, FIG. 5 shows the side-port vessels which have the outlets of the concentrated water on the side surfaces of the vessels. The amount of the permeated water which is treated in the first vessels 80*a*, 80*b* is increased, and the amount of the first concentrated water which remains not treated in the first vessels 80*a*, 80*b*, is decreased. By supplying the first concentrated water to the second vessel 82 from the plurality of first vessels 80*a*, 80*b* as shown in FIG. 7, the treatment is performed effectively. In the reverse osmosis treatment apparatus 110 shown in FIG. 7, the permeated water which is discharged from the outlet pipes 58*a*, 58*b* of the respective first vessels 80*a*, 80*b*, is mixed by the pipe 88 and discharged to the outside of the first vessels. The energy recovery apparatus 150, the measuring instrument 66, and the permeated water flow control valve 64 are provided on the pipe 88, and the amount of the permeated water can be regulated by adjusting the pressure in the first vessels 80*a*, 80*b* by the permeated water flow control valve 64.

Next, a specific usage of the energy recovery apparatus will be explained with reference to FIGS. 8 to 11.

Figure 8:
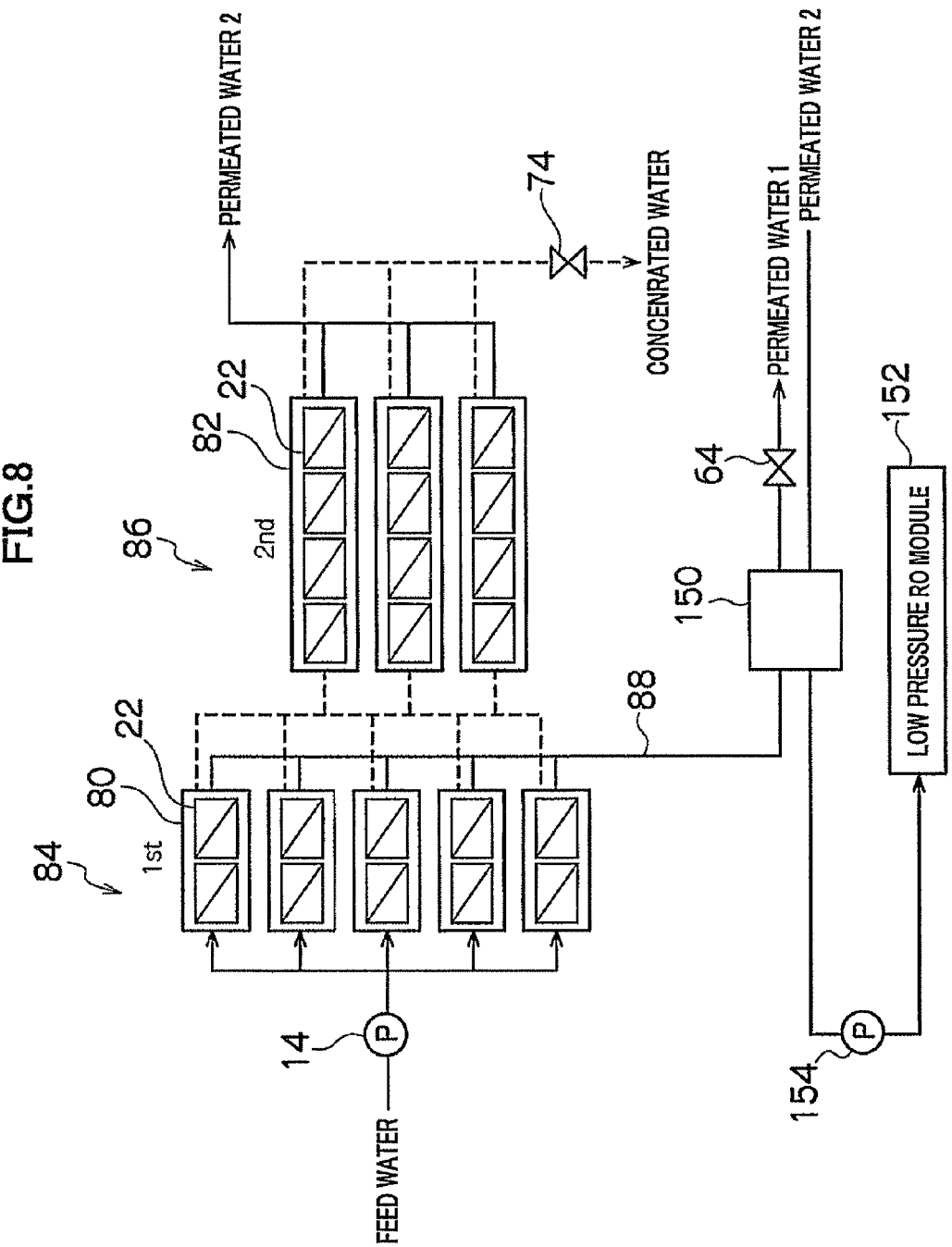
FIG. 8 is a schematic diagram of the reverse osmosis treatment apparatus including a PX/DWEER-type energy recovery apparatus.

FIG. 8 is a schematic diagram of the reverse osmosis treatment apparatus when using a PX (Pressure Exchange)-type energy recovery apparatus or a DWEER (Dual Work Energy Exchanger)-type energy recovery apparatus. As shown in FIG. 8, the energy recovery system 150 is provided between a first outlet pipe 58 (see FIG. 7) and the permeated water flow control valve 64. By providing the energy recovery system 150 between the first outlet pipe 58 and the permeated water flow control valve 64, the back pressure which is caused by regulating the flow rate by the permeated water flow control valve 64 can be recovered by the energy recovery apparatus 150. By providing the energy recovery system 150 between the permeated water flow control valve 64 and the first vessel 80, the pressure which is applied to the first vessel 80 can be recovered effectively. As the energy recovery apparatus, the PX-type energy recovery apparatus or the DWEER-type energy recovery apparatus can be used. As the PX-type energy recovery apparatus or the DWEER-type energy recovery apparatus, known ones can be used. By using the PX-type energy recovery apparatus or the DWEER-type energy recovery apparatus, the energy of about 95% can be recovered.

The PX-type energy recovery apparatus or the DWEER-type energy recovery apparatus transmits the pressure of the permeated water (referred to as "permeated water 1") which is discharged from the first vessel 80 and has the high pressure of 1 to 2 MPa, to the permeated water (referred to as "permeated water 2") which is discharged from the second vessel 82. The permeated water 2 having the exchanged high pressure is treated by a low pressure RO module 152 which can perform the reverse osmosis treatment with low pressure, so that the salt concentration of the permeated water 2 can be further reduced. The untreated water which is supplied to the second vessel 82 has high salt concentration, because the untreated water has been subjected to the primary treatment in the first vessel 80. Therefore, the permeation water 2 which is discharged from the second vessel 82 has the salt concentration higher than that of the permeated water which is discharged from the first vessel 80. The permeated water 2 having the lower salt concentration can be obtained by treating the permeated water 2 which is discharged from the second vessel 82 by the low pressure RO module 152. By using the back pressure applied to the first vessel 80 for the pressure feed to the low pressure RO module 152, the energy can be used effectively. In addition, since the pressure of the permeated water from the first vessel 80 is varied according to the operation conditions, a booster pump 154 can be provided considering a case where the pressure cannot be sufficiently applied to the permeated water 2. If the back pressure from the first vessel 80 is not sufficient, the pressure of the permeated water 2 can be raised by the booster pump 154.

The PX-type energy recovery apparatus has a plurality of cylindrical rotating bodies of revolver-shape, in which a pressure of a piston flow of the permeated water 1 from the first vessel 80 in one direction is transmitted to a pressure of a piston flow of the permeated water 2 from the second vessel 82 in the other direction.

The DWEER-type energy recovery apparatus has a plurality of cylindrical pressure vessels, in which the permeated water 1 from the first vessel 80 and the permeated water 2 from the second vessel 82 are divided by a partition wall in each cylinder, and switches the flow direction alternately to transmit a pressure in one direction to a pressure in the other direction.

Although the pressure transmission is performed between the permeated water 1 and the permeated water 2 in FIG. 8, it is not particularly limited to this if the pressure transmission can be performed between liquids. However, each of the liquids is in contact with each other in each energy recovery apparatus, the PX-type energy recovery apparatus or the DWEER-type energy recovery apparatus. If there is a difference between the salt concentrations of the used liquids (for example, the sea water and the permeated water), the concentration changes are caused when the pressure transmission is performed. Therefore, it is preferred that the difference between the salt concentrations of the liquids which exchange the pressures with each other is small, the permeated water 1 from the vessel 80 and the permeated water 2 from the vessel 82 are preferably used as shown in FIG. 8.

It is also preferred that the flow ratio of the permeated water 1 from the vessel 80 and the permeated water 2 from the vessel 82 is 1 to 1, because a volume ratio of an exchange destination and an exchange origination is approximately 1 to 1 in the PX-type energy recovery apparatus and the DWEER-type energy recovery apparatus. However, there are cases where either of the volumes of the exchange destination and the exchange origination increases depending on the operation conditions. When the volume of the permeated water 2 from the second vessel is larger than that of the permeated water 1 from the first vessel, the pressure can be increased by the booster pump 154, and when the volume of the permeated water 1 from the first vessel is larger than that of the permeated water 2 from the second vessel, the surplus energy can be merely discarded without any problems.

Figure 9:
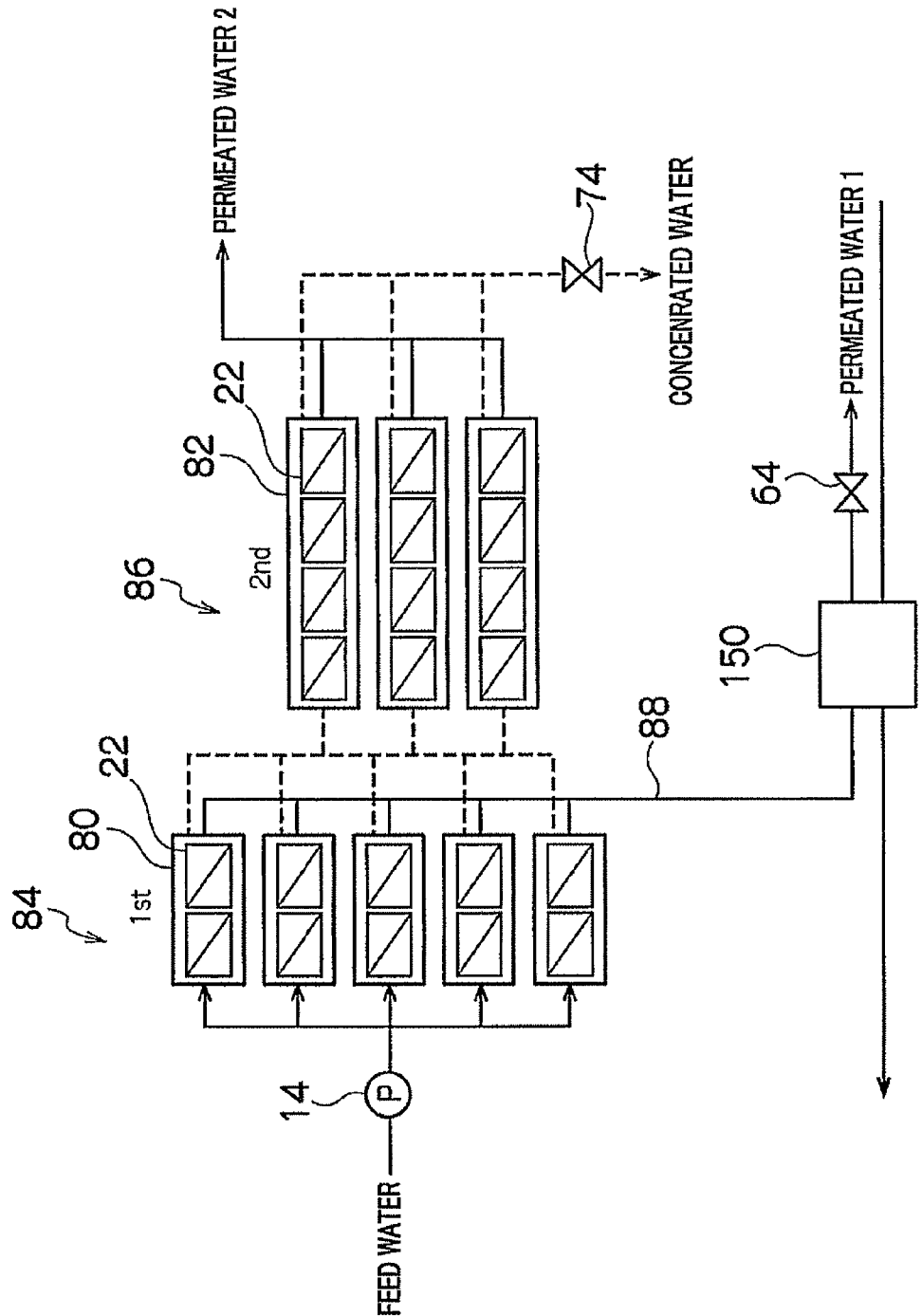
FIG. 9 is a schematic diagram of the reverse osmosis treatment apparatus including a turbocharger-type energy recovery apparatus.

FIG. 9 shows a schematic diagram of the reverse osmosis treatment apparatus when the turbocharger-type energy recovery apparatus is used as the energy recover apparatus. The turbocharger-type energy recovery apparatus converts the back pressure from the first vessel 80 into the rotation power of the turbine, and uses the rotation energy to increase the liquid pressure of the exchange destination. It is possible to recover the energy of about 90% by using the turbocharger-type energy recovery apparatus.

When the turbocharger-type energy recovery apparatus is used, all water in the reverse osmosis treatment apparatus can utilize the back pressure, because the liquids exchanging energies with each other are not in contact with each other.

Figure 10:
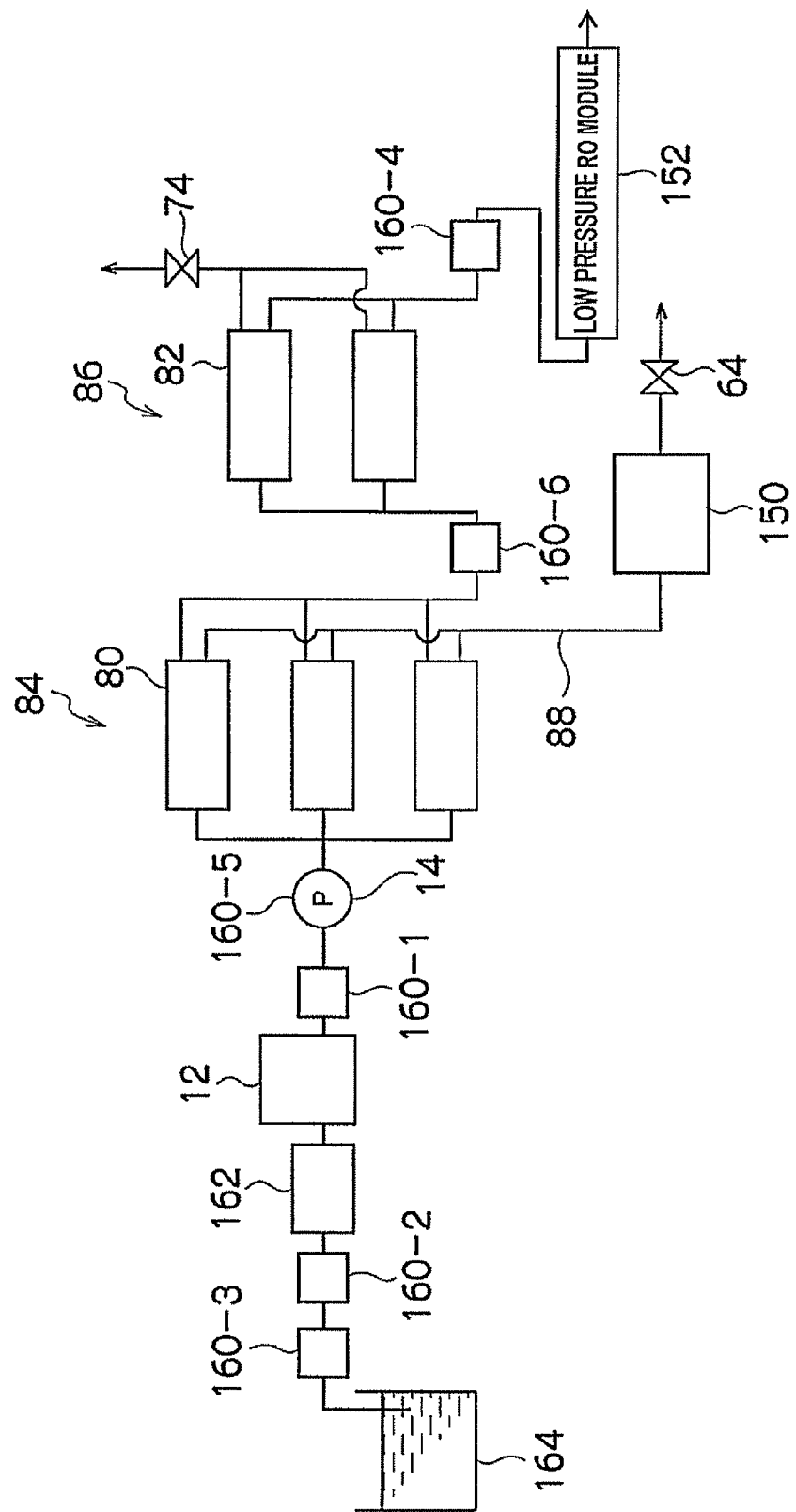
FIG. 10 is a diagram illustrating an energy exchange destination used by the turbocharger-type energy recovery apparatus.

The pressures of liquids which are supplied on the positions shown in FIG. 10 can be boosted by utilizing the back pressures. The energy recovery apparatus 150 which is described in FIG. 10 can be provided on respective positions "160-1" to "160-6" in FIG. 10, and can supply the liquids by performing the energy exchanges. More specifically, the energy recovery apparatus 150 is provided on the respective positions as described below. The position "160-1" shows an alternative or auxiliary feed pump for the high pressure pump 14 which supplies the untreated water to the first vessels 80. The position "160-2" shows a feed pump which supplies the untreated liquid to a pretreatment system 162 which can treat the untreated liquid at low pressure, for example, by sand filtration, MF (Microfiltration) membranes, and UF (Ultrafiltration) membranes. The position "160-3" shows a feed pump which supplies waste water from a tank 164 to the feed pump on the position "160-2", and which can be used at the pressure lower than that of the pretreatment system 162. The position "160-4" shows a feed pump which supplies the permeated water from the second vessels 82 to the low pressure RO module 152. The position "160-5" shows an auxiliary pump which boosts the high pressure pump 14. The position "160-6" shows a pump which boosts the primary concentrated water discharged from the first vessel 80 and can be used to increase the recovery rate and the amount of water production at the second vessel 82. Since the liquids utilize the back pressure from the first vessel 80 to be boosted, it is preferred that the liquids are used at the low pressure portion and used in the order of the positions described above.

Figure 11:
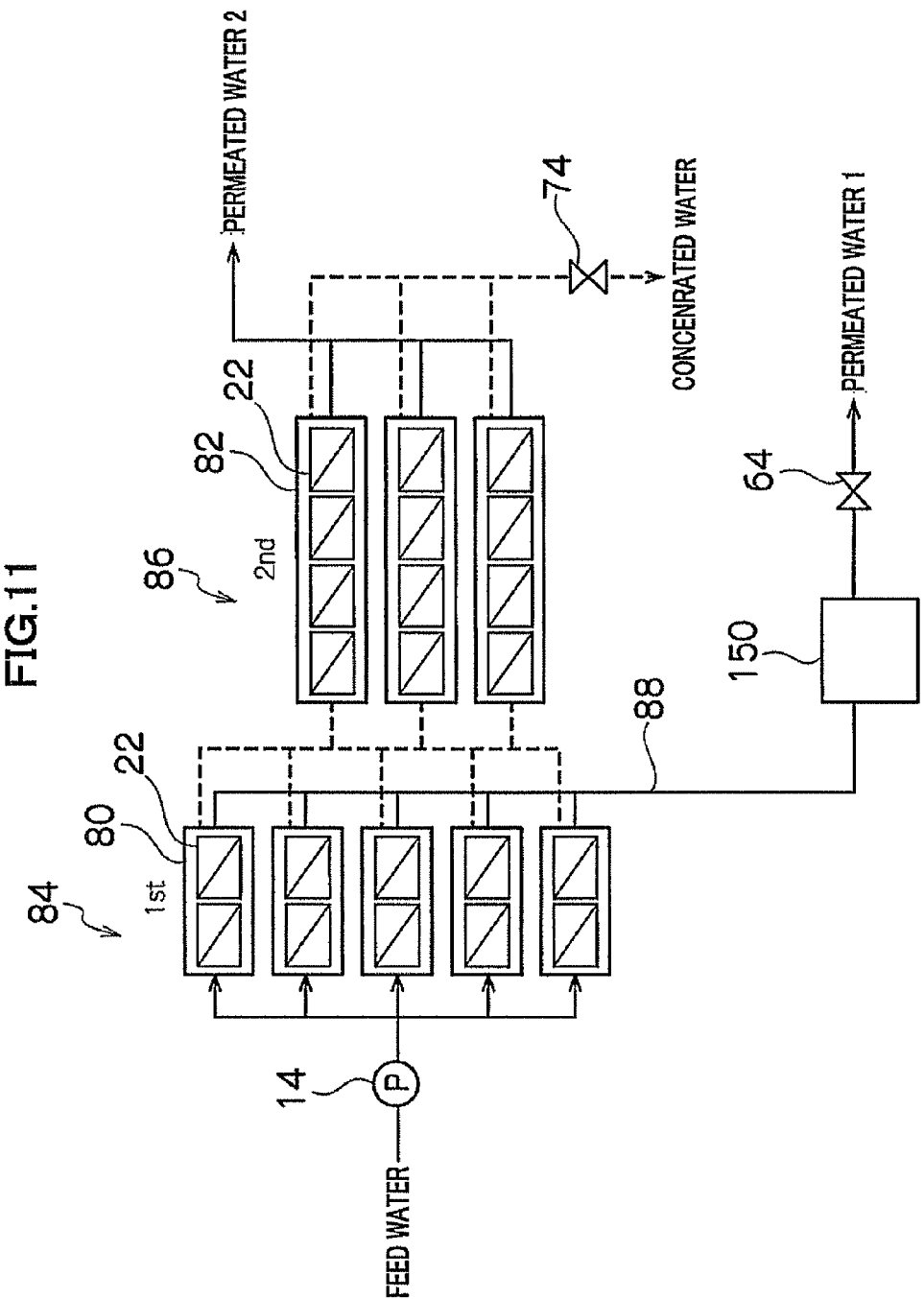
FIG. 11 is a schematic diagram of the reverse osmosis treatment apparatus including a turbine generator.
Figure 12:
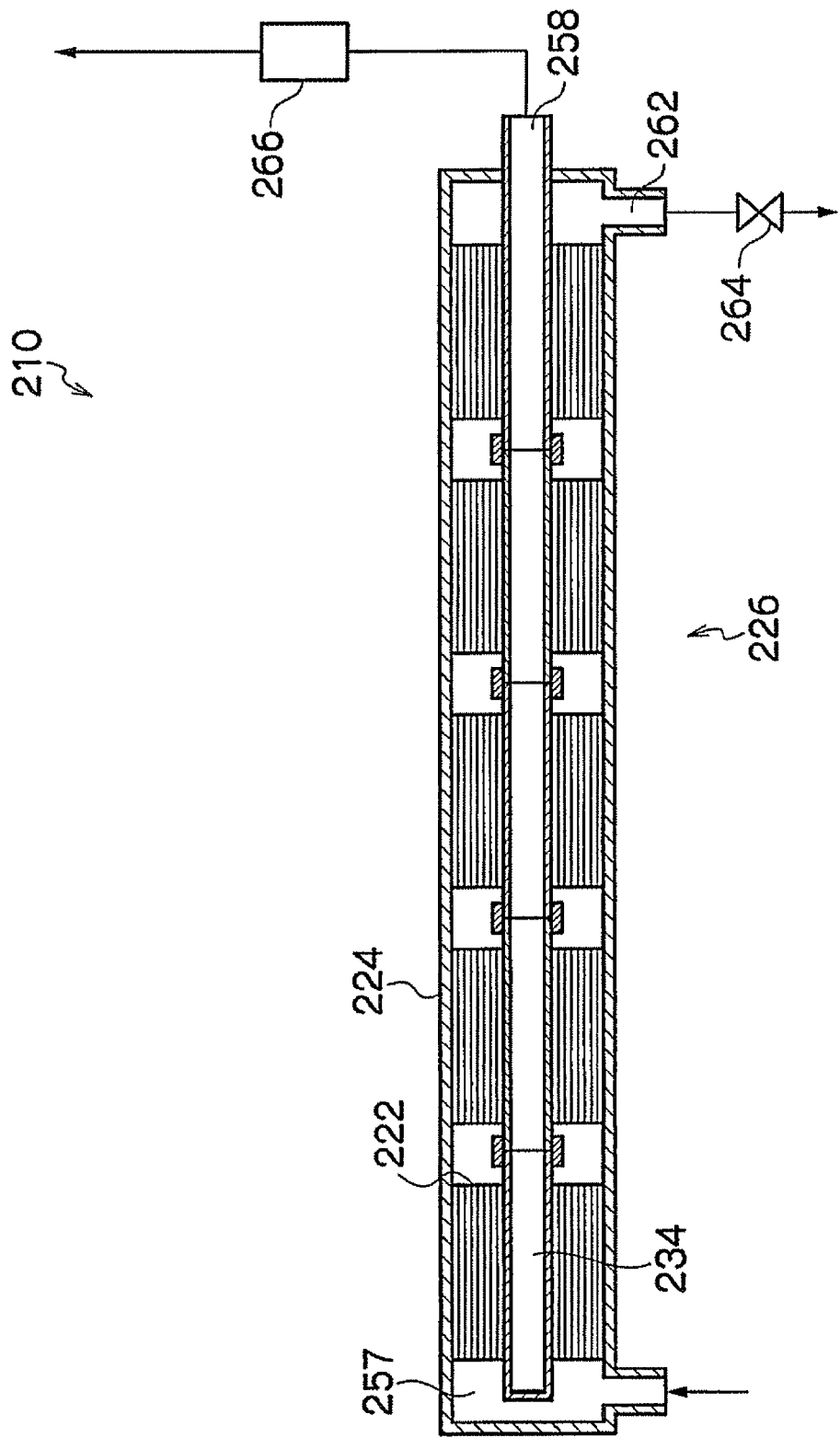
FIG. 12 is a cross-sectional view showing a schematic configuration of a conventional reverse osmosis treatment apparatus.
Figure 13:
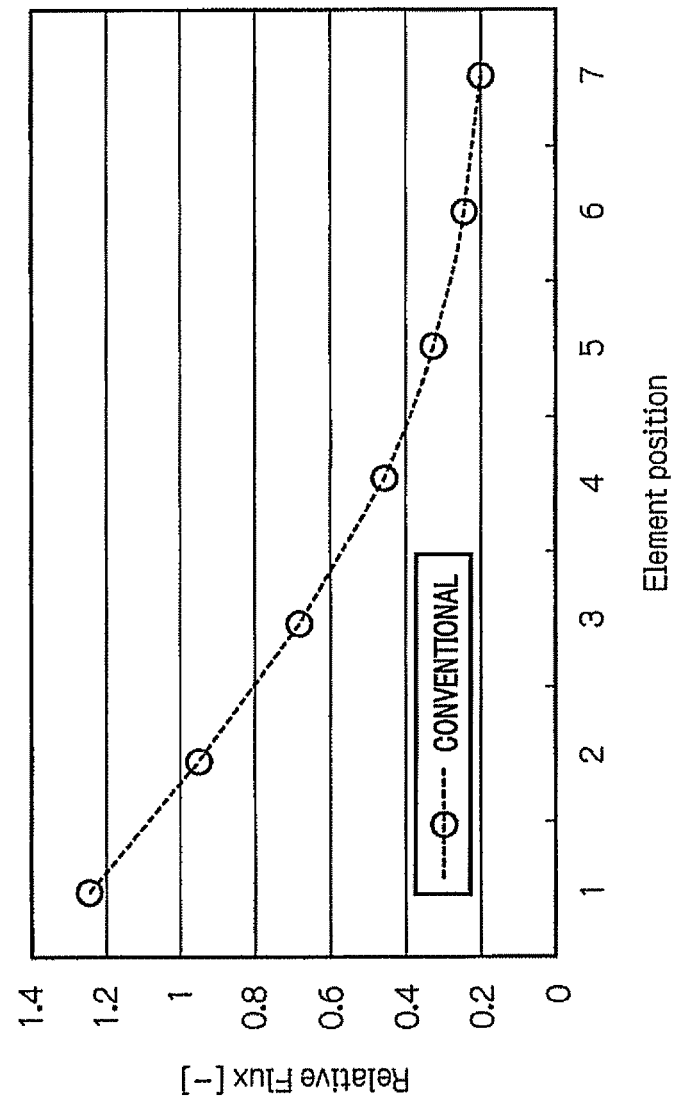
FIG. 13 is a graph showing a relationship between a "relative flux" of permeated water and an "element position" of the RO membrane element of the conventional reverse osmosis treatment apparatus.

FIG. 11 is a schematic diagram of the reverse osmosis treatment apparatus when a turbine generator is used as the energy recovery apparatus 150. In FIG. 11, the turbine generator can generate power by utilizing the back pressure from the first vessel 80 to rotate a turbine. The operation power for the reverse osmosis treatment apparatus can be decreased by using the power generated by the turbine generator for the power of the reverse osmosis treatment apparatus.

REFERENCE SIGNS LIST 10, 110: reverse osmosis treatment apparatus
12, 164: tank
14: high pressure pump
16: permeated water
18: concentrated water
20: desalination system
22: element (reverse osmosis membrane element)
28: RO membrane
30: outlet pipe
32: membrane unit
34: water collection pipe
36: through hole
38, 40: spacer
56: treatment water inlet pipe
57, 69: flow passage
58: first outlet pipe
62: first concentrated water outlet pipe
64: permeated water flow control valve
66, 76: measuring equipment
68: primary treated water inlet pipe
70: secondary concentrated water outlet pipe
72: secondary outlet pipe
74: concentrated water outlet valve
80: first vessel (first pressure vessel)
82: second vessel (second pressure vessel)
84: first module
86: second module
88: pipe
150: energy recovery apparatus
152: low pressure RO module
154: booster pump
162: pretreatment system

The invention claimed is:

1. A reverse osmosis treatment apparatus, comprising
first pressure vessels, where each pressure vessel of the first pressure vessels is a first pressure vessel for a primary treatment of untreated water, and
second pressure vessels, where each pressure vessel of the second pressure vessels is a second pressure vessel for a secondary treatment of the water treated by the primary treatment, wherein
a plurality of reverse osmosis membrane elements having a reverse osmosis membrane are arranged in series along a water collection pipe in the first pressure vessel and the second pressure vessel, wherein
the first pressure vessel comprises
an untreated water inlet pipe which supplies the untreated water on one end thereof,
a first concentrated water outlet pipe which discharges the water treated by the primary treatment on the other end thereof,
a first outlet pipe which discharges permeated water, and
a permeated water flow control valve which is connected to the first outlet pipe and regulates a pressure in the first pressure vessel,
the second pressure vessel comprises
a primarily treated water inlet pipe which introduces the water treated by the primary treatment on one end thereof,
a second concentrated water outlet pipe which discharges the water treated by the secondary treatment on the other end thereof, and
a second outlet pipe which discharges the permeated water,
the number of the reverse osmosis membrane elements in the first pressure vessel is two to three, and is less than the number of the reverse osmosis membrane elements in the second pressure vessel,
the number of the first pressure vessels is greater than the number of the second pressure vessels,
the permeated water flow control valve is controlled by measuring at least one of electric conductivity, pressure and flow rate of the permeated water from the first pressure vessel, and
an energy recovery apparatus is provided between the first outlet pipe and the permeated water flow control valve.

2. The reverse osmosis treatment apparatus as set forth in claim 1, wherein the energy recovery apparatus is a PX-type energy recovery apparatus or a DWEER-type energy recovery apparatus.

3. The reverse osmosis treatment apparatus as set forth in claim 1, wherein the energy recovery apparatus is a turbocharger-type energy recovery apparatus.

4. The reverse osmosis treatment apparatus as set forth in claim 1, wherein the energy recovery apparatus is a turbine generator.

5. The reverse osmosis treatment apparatus as set forth claim 1, further comprising
a third pressure vessel having reverse osmosis membrane elements which are capable of reverse osmosis treatment at low pressure, wherein
the energy recovery apparatus converts a back pressure of the permeated water which is discharged from the first pressure vessel, to the pressure applied to the permeated water which is discharged from the second pressure vessel, and wherein the permeated water having an increased pressure from the second pressure vessel is treated in the third pressure vessel.

6. The reverse osmosis treatment apparatus as set forth in claim 3, further comprising a high pressure pump which supplies the untreated water to the first pressure vessel, wherein an energy which is recovered by the turbocharger-type energy recovery apparatus is used as a supply means which supplies an untreated liquid to the high pressure pump.

7. The reverse osmosis treatment apparatus as set forth in claim 3, further comprising a pretreatment system which performs a pretreatment for the untreated water which is supplied to the first pressure vessel, wherein the energy which is recovered by the turbocharger-type energy recovery apparatus is used as a supply means which supplies the untreated liquid to the pretreatment system.

\* \* \* \* \*